United States Patent
Boss et al.

(10) Patent No.: US 7,793,058 B2
(45) Date of Patent: Sep. 7, 2010

(54) METHOD AND APPARATUS FOR NEGOTIATING REVISED SERVICE LEVEL AGREEMENTS

(75) Inventors: Gregory Jensen Boss, American Fork, UT (US); Christopher James Dawson, Arlington, VA (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 11/109,086

(22) Filed: Apr. 19, 2005

(65) Prior Publication Data

US 2006/0236062 A1   Oct. 19, 2006

(51) Int. Cl.
*G06F 13/00* (2006.01)
*G06F 12/00* (2006.01)
(52) U.S. Cl. ...................... 711/156; 711/170
(58) Field of Classification Search .................. 711/170
See application file for complete search history.

(56) References Cited

U.S. PATENT DOCUMENTS

| | | | |
|---|---|---|---|
| 5,463,000 A | 10/1995 | Miyoshi et al. | |
| 5,495,412 A | 2/1996 | Thiesses | 364/401 |
| 5,924,082 A | 7/1999 | Silverman et al. | 705/37 |
| 6,112,189 A | 8/2000 | Rickard et al. | 705/37 |
| 6,141,653 A | 10/2000 | Conklin et al. | 705/80 |
| 6,154,778 A | 11/2000 | Koistinen et al. | 709/228 |
| 6,401,080 B1 | 6/2002 | Bigus et al. | 705/37 |
| 6,816,882 B1* | 11/2004 | Conner et al. | 709/203 |
| 2003/0110254 A1 | 6/2003 | Fujita et al. | |
| 2004/0064557 A1 | 4/2004 | Karnik et al. | |
| 2004/0064558 A1 | 4/2004 | Miyake | |
| 2004/0073502 A1 | 4/2004 | Agrawal et al. | |
| 2004/0088417 A1 | 5/2004 | Bober et al. | 709/227 |
| 2004/0162892 A1 | 8/2004 | Hsu | 709/221 |
| 2004/0181476 A1 | 9/2004 | Smith et al. | |
| 2004/0243692 A1* | 12/2004 | Arnold et al. | 709/220 |
| 2005/0076154 A1 | 4/2005 | Chambliss et al. | |

FOREIGN PATENT DOCUMENTS

JP   2003177963 A   6/2003

* cited by examiner

*Primary Examiner*—Mardochee Chery
(74) *Attorney, Agent, or Firm*—Yee & Associates, P.C.; William H. Steinberg

(57) ABSTRACT

An application's storage availability is adjusted by noting a storage event occurrence. An occurrence that necessitates a requirements change triggers negotiation, wherein a series of negotiation stages are presented to a storage provider server. For each storage provider response to a transmitted negotiation stage, a determination is made to see if the response is better than the proposal described in the negotiation stage. If so, the application commits the storage changes.

20 Claims, 3 Drawing Sheets

METHOD AND APPARATUS FOR NEGOTIATING REVISED SERVICE LEVEL AGREEMENTS

BACKGROUND OF THE INVENTION

1. Technical Field

The invention relates to the field of data storage and redundancy. More specifically the invention relates to a manner of fairly allocating a multi-dimensional disk array among competing parties through a negotiating process.

2. Description of Related Art

Storage is a critical component of almost every software application in use today. As the storage industry has matured, there have been increases to both the number of storage options and the performance of data entry and retrieval. Storage options include, e.g., magnetic tape, Hard Disk Drives (HDD), CD-ROMs, DVD-ROMs, and optical media. HDD category includes, e.g., standalone HDDs, arrays of disks and complex virtual storage environments.

Disk arrays may be classified, e.g., Redundant Array of Inexpensive Disks (RAID) 0, RAID 1, RAID 0+1 (which have enhanced redundancy and performance), RAID 1+5 and RAID 5, among others. Virtual storage environments include Storage Area Networks (SANs). Each storage option has an associated cost and service level, both of which vary widely.

Some applications, e.g. hosted on one or more servers, occasionally get markedly increased demands for the features of the application. This can result in rapid fluctuations in CPU utilization, network traffic and particularly, for storage. Sometimes these "peak" times are well known and can be identified by a scheduled event, e.g. a date, time and duration. Other times, the peaks are unscheduled, and some responsiveness is needed in an ad hoc manner.

SUMMARY OF THE INVENTION

A method for setting a level of service for storage begins with monitoring a performance level. If the performance level is beyond a threshold, a further determination is made to see if a requirement change occurred. If so, the embodiment looks up an unused negotiation stage from a set of negotiation stages stored in metadata. Provided the negotiation stage exists, a request is made for a service based on the unused negotiation stage—wherein the request goes out to a storage provider server. The storage provider makes (or at least appears to make) a storage provider response. The embodiment determines if the SP response is acceptable. If so, the embodiment commits a storage change based on the SP response.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

An aim of the present invention is to provide for both scheduled and unscheduled peaks by permitting a form of negotiation between a storage user or consumer with a counterpart computer system, known as the storage provider.

Figure 1:
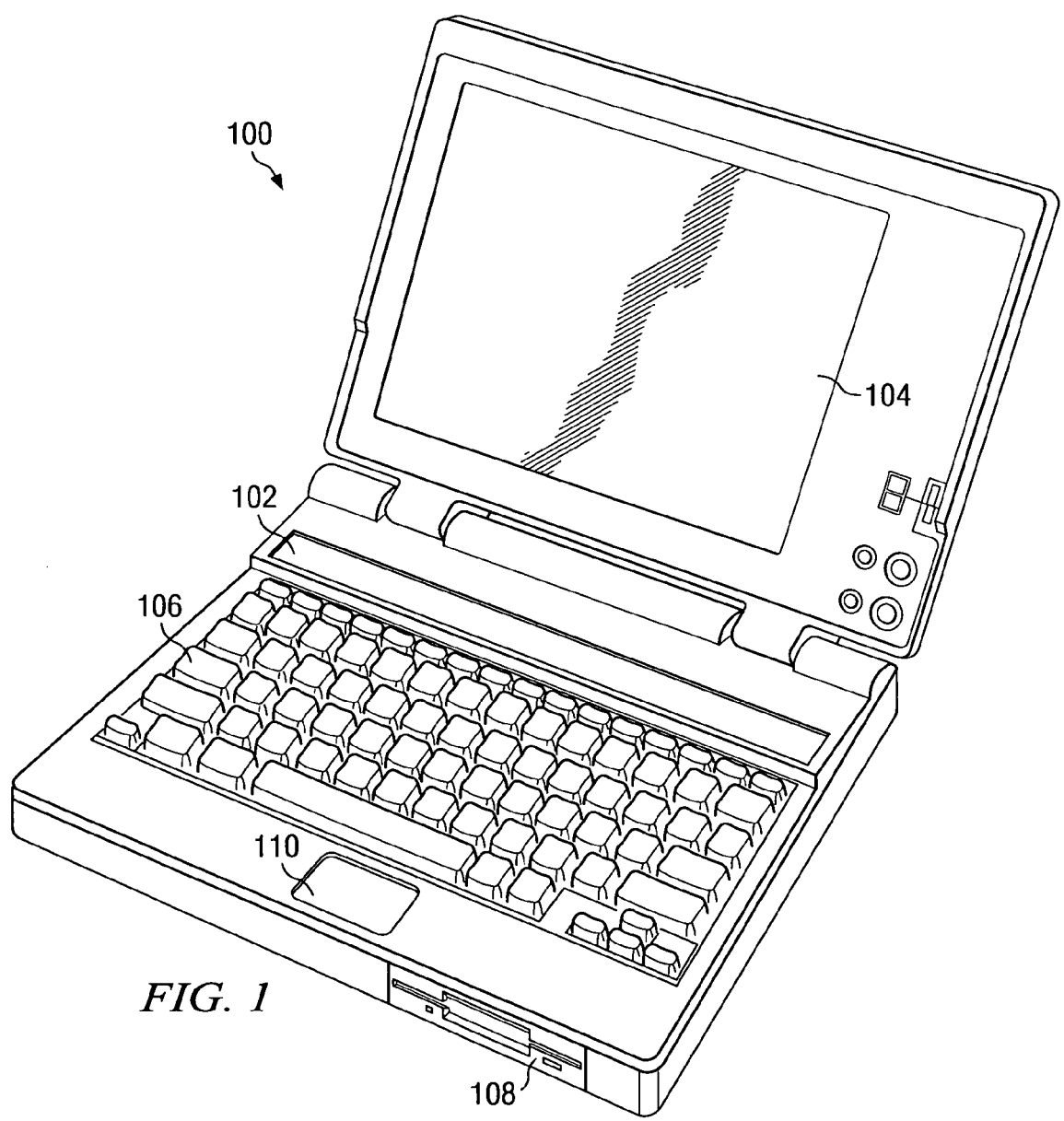
FIG. 1 shows a data processing system in accordance with an illustrative embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
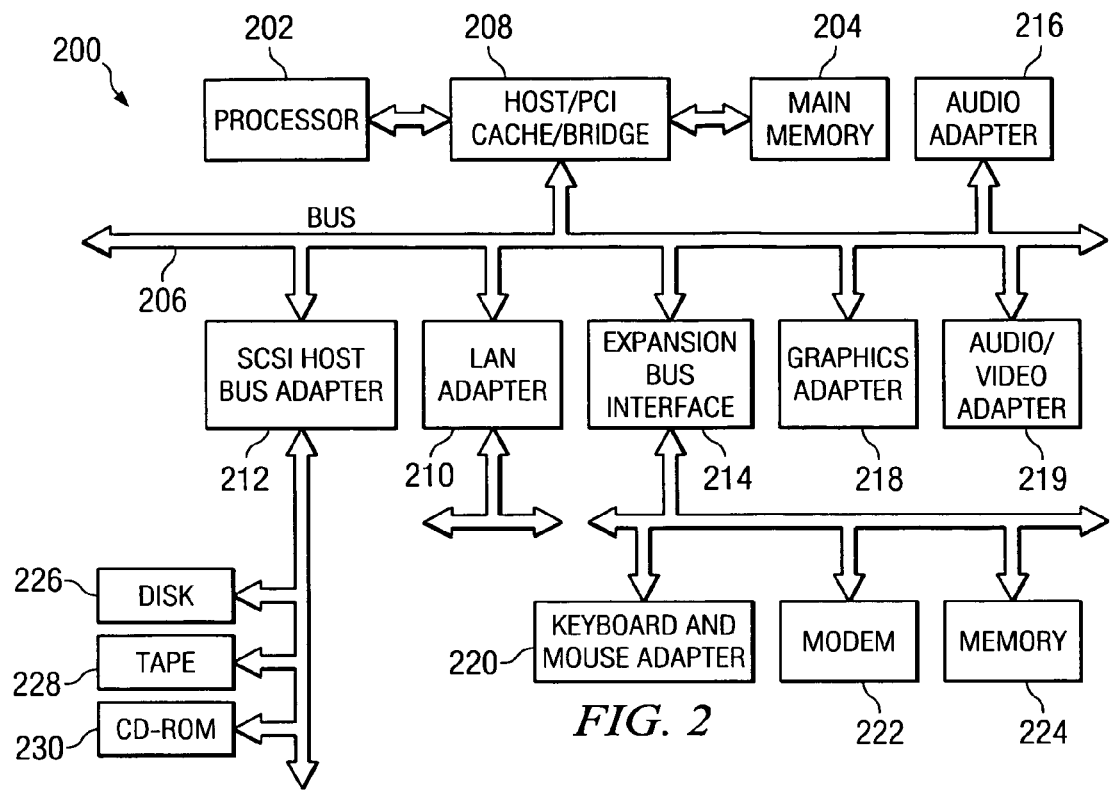
FIG. 2 shows a block diagram of some of the component parts in accordance with an illustrative embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. Instructions for the operating system, an object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Table 1 depicts a metadata structure. For the computer system of FIG. 2, there is a single metadata structure that has one, and often several negotiation stages. A negotiation stage is a list of at least two requirements. The requirements are usually a kind of test or criteria with which to measure the "goodness" of the proposal from the perspective of the storage consumer. As such, each parameter (as shown in the rows in Table 1) is sought to be "as good or better". This may mean, in some circumstances, that a parameter must be "equal or greater than" to satisfy the criteria. In other circumstances, a parameter must be "equal or lesser than".

| | Example Values | | |
|---|---|---|---|
| MetaData | Negotiation Stage 1 | Negotiation Stage 2 | Negotiation State ... N |
| Redundancy | | | |
| RAID Level | RAID 5 | RAID 1 | RAID 0 |
| External Backup General | Required | Required | Optional |
| Time Range | 8:00 am–11:00 am | 8:00 am–11:00 am | 8:00 am–11:00 am |

-continued

| | Example Values | | |
|---|---|---|---|
| MetaData | Negotiation Stage 1 | Negotiation Stage 2 | Negotiation State ... N |
| Date Range | M–F, Aug 19–22, $1^{st}$ and $3^{rd}$ Tuesday | | |
| Space Needed | 20 GB | 18 GB | 15 GB |
| Delay to next negotiation Performance | 10 mins | 2 hours | 4 hours |
| Throughput | 1.544 TI Sustained | 300 kbps sustained, 1.2 Mbps burst | 250 kbps minimum |
| Time to recover | 5 minutes | 30 minutes | 2 hours |
| SLA Availability Cost | 99.999% | 99.9% | 95% |
| Disk Usage | $.05/MB/day | $.05/MB/day | $.04/MB/day |
| Admin | $.10/negotiation | $.10/negotiation | $.10/negotiation |
| Data Transfer | $.0001/MB I/O | $.0001/MB I/O | $.0001/MB I/O |

Parameters may include a data throughput rate, either measured in a long-term sustained rate, or on a burst criteria. Other parameters may be the percent availability during a contracted or negotiated period, which may be during a month. Time to recover from failure may be a parameter. Presence of backup as being either "none", "optional" or "required" could be another parameter. Space could be another parameter. Architecture among the Redundant Array of Inexpensive Disks (RAID) also could be a parameter, wherein requirements could be for RAID 0, RAID 1, RAID 5, among others.

Other parameters do not measure goodness. Those parameters include: time range, date range and delay to next negotiation.

The final three lines of Table 1 show a monetary exchange for various features of the storage on a 'per' basis, i.e. for each accounted consumption or use, a charge is applied which may be later used for billing. It is appreciated that instead of monetary units, a token accounting may be applied. Here, a pool of credits or tokens would be allocated to several applications (each distinct embodiments of the invention). Each application would have its tokens limited to those with which it is configured, as from time to time replenished by a common administrative team. Such an environment would be suited, for example, to a corporation or other common legal entity which owns or controls the storage provider server and the various computers that run applications that are operating embodiments of the invention. It would thus be the relative scarcity of tokens that would guide the establishment of (by delegated personnel of the entity) negotiation stages within each application.

Figure 3:
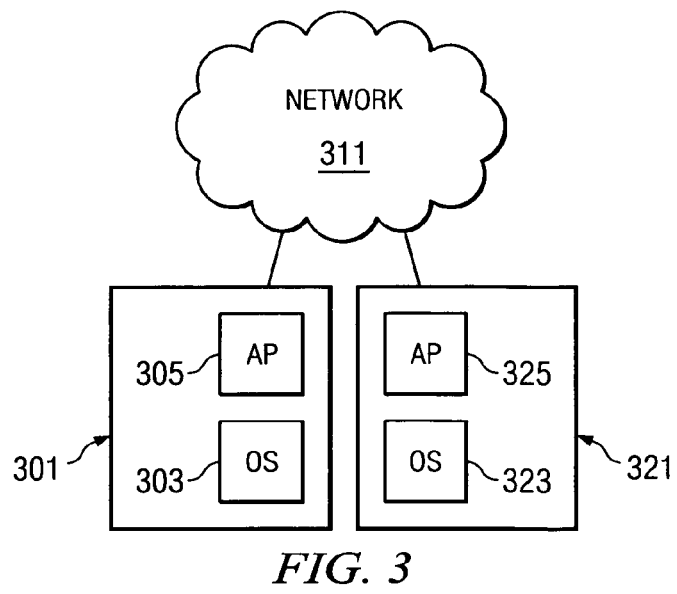
FIG. 3 is a block diagram of a network in accordance with an illustrative embodiment of the present invention.

FIG. 3 is a block diagram of a network in accordance with an illustrative embodiment of the present invention. Storage consumer 301 may support a running application that is constructed using a data processing system, such as data processing system 200 of FIG. 2. Of course, storage consumer 301 may be implemented with any suitable data processing system. Storage consumer 301 may run an operating system 303, which may provide partitioned access to hardware resources to one or more applications 305 that, from time to time, may be run on storage consumer 301. An application may execute the steps of an embodiment of the present invention, and via the network 311, may communicate with storage provider 321. Storage provider 321, likewise, may operate hardware constructed according a data processing system, such as data processing system 200 in to FIG. 2. An operating system 323 may operate upon such hardware, and support one or more applications 325. Storage provider 321 may merely be a commercial, widely available storage, such as, e.g. gmail.com, photobucket.com or any other service that describes a rudimentary storage made available online.

Figure 4:
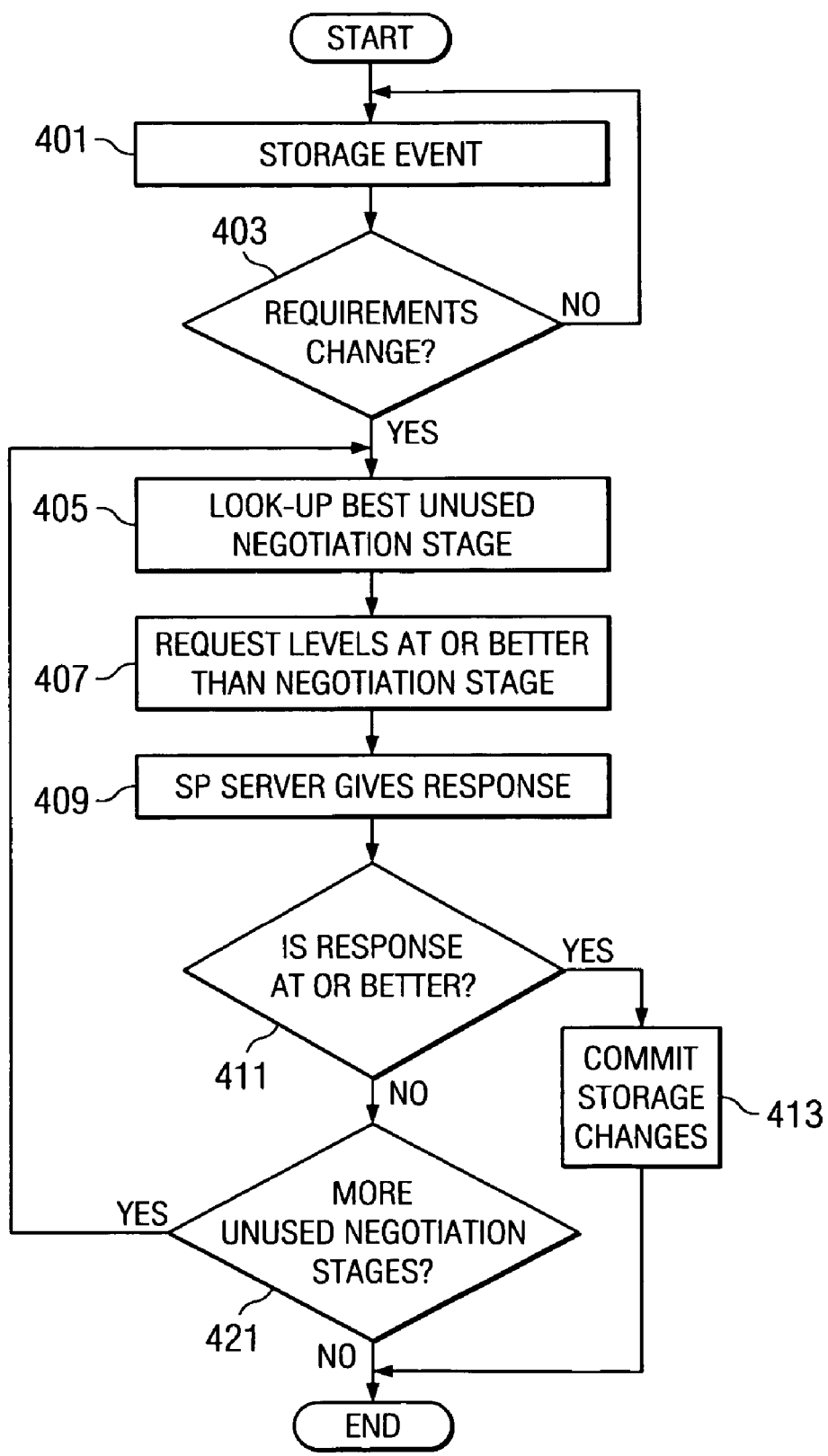
FIG. 4 shows a flow diagram expressing the steps that an embodiment may take to occasionally update requirements and an agreement with a storage provider server in accordance with an illustrative embodiment of the present invention.

FIG. 4 is a flowchart showing the steps performed at a storage consumer. The storage consumer may measure a performance level that may correlate with data storage requirement fluctuations. For example, the storage consumer may measure CPU usage which might suggest that locally run applications need more or less data storage. Another example may be shifts in the network throughput. Still another example might be the occurrence of a certain time—which may denote usage shifts as may occur, e.g. with the lull that happens on websites when a geographic area finishes celebrating the New Year, and thus people are retiring to bed. These changes in CPU usage, network throughput and time are examples of changes in performance level. When the performance level, however measured, goes beyond a threshold, a storage event (step 401) is deemed to have occurred.

A storage event may also occur based on a scheduled event. Thus an alternative storage event occurs when detecting a scheduled event. Either an internal timekeeping device may signal an event occurrence, or the data processing system 200 may determine time through a network available resource, among other things.

Following the detected storage event, the embodiment, hereinafter called "consumer" makes an evaluation of whether currently available (or committed) resources are sufficient to meet the anticipated needs, i.e. it determines whether a requirements change occurred (step 403). If the determination is "no", then continued monitoring for a storage event continues. If the determination is "yes", then the embodiment looks up (step 405) an unused negotiation stage from among at least one negotiation stages stored in a metadata structure or storage requirements profile. The unused negotiation stage is unused from the perspective that it has not been used in a recent iteration of the steps (step 405) through (step 411). The unused negotiation stage may be selected on the basis of its "goodness". Such negotiation stages may be used in order, and may be exhausted when the worst negotiation stage is used in the steps (step 405) through (step 411).

The embodiment may request (step 407) a service based on the unused negotiation stage. The service request may contain two or more of the parameters from the unused negotiation stage. The use of "as good or better" or "equal or greater than" in the request is unnecessary, as such conditions are implicit in the role of storage consumer—i.e. its obvious that a user of storage would prefer, all other things being equal, that the storage amount be greater than required. Thus the request may be a packet or series of packets that carry two or more of the parameters from the unused negotiation stage. The request may include the steps of forming the packet or packets, as well as the sending of such packet or packets via a LAN adapter 210 from FIG. 2. The request (step 407) of the storage consumer, may be an http request or SOAP request made to a terms of service page or a known service parameter page of the storage provider, wherein the http request or Simple Object Access Protocol (SOAP) request may carry parameters of the negotiation stage to the storage provider.

A storage provider (SP) may create a service provider response or SP response. The SP response may acknowledge and accept the request. The SP response may echo back the parameters in the request—an indication of acceptance. The SP response may vary one or more parameters, showing what it is committing. In any event, the consumer may receive the response (step 409). The request may return a hypertext markup page from the storage provider as the SP response. As needed the storage consumer may screen scrape the hypertext markup page to select the details that are applicable, e.g. storage capacity, duration of offer and the like in association with the receiving the response (step 409).

Consumer may evaluate to see if the SP response is at or better than the request parameters, i.e. determining that the SP response is acceptable (step 411). If not, more negotiation stages are looked up (step 405), provided there are more unused negotiation stages (step 421).

Eventually, it is hoped that the SP response is acceptable (step 411), which is known to occur if all parameters are at or better than any request made. If this happens, the consumer commits the storage change (step 413). And such committed changes may form the basis for determining if a requirements change happens later. Committing the storage change could be as simple as lighting a green LED for as long as adequate storage has been committed for the next 24 hour period. Committing the storage change could be establishing a reference table of the network location of the storage that is intended to be used during an interval, e.g. by mapping a network drive to a preferred letter designation. The committing of the storage may include calling a program to automatically give registration details to a known registration page of the storage provider.

At the conclusion of committing the storage changes (step 413), the steps of the embodiment may end. At this time, any entry or row in a metadata structure (Table 1) is considered to be renewed and, once again, in an unused state.

Among the advantages, the present invention may be able to respond to changing conditions, or anticipated changes, and attempt to obtain revised storage size, speed, durability among other parameters, without discernable operator intervention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for setting a level of service for storage comprising the steps of:
    detecting an occurrence of a scheduled storage event, wherein detecting an occurrence of a scheduled storage event comprises:
        monitoring a performance level that correlates with data storage requirement fluctuations; and
        determining that the performance level is beyond a threshold, wherein the occurrence of a scheduled storage event is detected when the performance level is determined to be beyond the threshold;
    in response to detecting the occurrence of the scheduled storage event, determining whether a requirement change occurred;
    in response to determining that a requirement change occurred, looking up a first unused negotiation stage from among a plurality of negotiation stages stored in a metadata structure, wherein the first unused negotiation stage is looked up on the basis of at least one parameter comprising at least one of data throughput rate, time to recover from failure, and presence of backup;
    requesting an online storage service based on the first looked up unused negotiation stage to form a first request;
    receiving a first service provider response to the first request;
    determining whether the first service provider response is acceptable;
    in response to determining that the first service provider response is acceptable, committing a storage change based on the first service provider response;
    in response to determining that the first service provider response is not acceptable, determining whether a second unused negotiation stage exists;
    in response to the determining that a second unused negotiation stage exists, looking up the second unused negotiation stage from among the plurality of negotiation stages stored in the metadata structure, wherein the second unused negotiation stage is looked up on the basis of at least one parameter comprising at least one of data throughput rate, time to recover from failure, and presence of backup;
    requesting the online storage service based on the second unused negotiation stage to form a second request;
    receiving a second service provider response to the second request;
    determining whether the second service provider response is acceptable; and
    in response to determining that the second service provider response is acceptable, committing a storage change based on the second service provider response, wherein committing the storage change based on the first or second service provider response comprises establishing a reference table of a network location of a storage that is to be used during a time interval.

2. A method for setting a level of service for storage comprising the steps of:
    detecting a storage event for a running application;
    determining whether a requirement change occurred in response to detecting a performance level of the running application being beyond a threshold;
    looking up an unused negotiation stage from among at least one negotiation stage stored in a metadata structure in response to determining that a requirement change occurred, wherein the unused negotiation stage is looked up on the basis of at least one parameter comprising at least one of data throughput rate, time to recover from failure, and presence of backup;
    requesting a service based on the unused negotiation stage;
    receiving a service provider response;
    determining whether the service provider response is acceptable; and
    committing a storage change for the running application based on the service provider response.

3. The method for setting a level of service for storage of claim 2, wherein the step of detecting comprises the steps of:
    monitoring a performance level; and
    detecting whether the performance level is beyond a threshold.

4. The method for setting a level of service for storage of claim 2, wherein the step of detecting comprises the step of:
    detecting a scheduled event.

5. The method for setting a level of service for storage of claim 2, wherein the step of requesting a service based on the unused negotiation stage comprises:
    requesting a service based on the unused negotiation stage, wherein the unused negotiation stage has a token accounting.

6. The method of claim 2 following the step of determining whether the service provider response is acceptable, comprising the steps:
    determining whether a second unused negotiation stage exists in response to a determining that the service provider response is not acceptable;
    looking up the second unused negotiation stage from among the at least one negotiation stage stored in the metadata structure in response to determining that the second unused negotiation stage exists;
    requesting a service based on the second unused negotiation stage;
    receiving a second service provider response; and
    determining whether the second service provider response is acceptable.

7. The method for setting a level of service for storage of claim 6, wherein the step of detecting comprises the steps of:
    monitoring a performance level; and
    detecting whether the performance level is beyond a threshold.

8. The method for setting a level of service for storage of claim 6, wherein the step of detecting comprises the step of:
    detecting a scheduled event.

9. A storage consumer for setting a level of service for storage comprising:
    a means for detecting a storage event for a running application;
    a means for determining whether a requirement change occurred in response to detecting a performance level of the running application being beyond a threshold;
    a means for looking up an unused negotiation stage from among at least one negotiation stage stored in a metadata structure in response to determining that a requirement change occurred, wherein the unused negotiation stage is looked up on the basis of at least one parameter comprising at least one of data throughput rate, time to recover from failure, and presence of backup;
    a means for requesting a service based on the unused negotiation stage;
    a means for receiving a service provider response;
    a means for determining whether the service provider response is acceptable; and
    a means for committing a storage change for the running application based on the service provider response.

10. The storage consumer for setting a level of service for storage of claim 9, wherein the means for detecting comprises:
a means for monitoring a performance level; and
a means for detecting whether the performance level is beyond a threshold.

11. The storage consumer for setting a level of service for storage of claim 9, wherein the means for detecting comprises:
a means for detecting a scheduled event.

12. The storage consumer for setting a level of service for storage of claim 9, wherein the means for requesting a service based on the unused negotiation stage comprises:
a means for requesting a service based on the unused negotiation stage, wherein the unused negotiation stage has a token accounting.

13. The storage consumer of claim 9, further comprising:
a means for determining whether a second unused negotiation stage exists in response to a determining that the service provider response is not acceptable;
a means for looking up the second unused negotiation stage from among the at least one negotiation stage stored in the metadata structure in response to determining that the second unused negotiation stage exists;
a means for requesting a service based on the second unused negotiation stage;
a means for receiving a second service provider response; and
a means for determining whether the second service provider response is acceptable.

14. The storage consumer for setting a level of service for storage of claim 13, wherein the means for detecting comprises:
a means for monitoring a performance level; and
a means for detecting whether the performance level is beyond a threshold.

15. A data processing system comprising:
a memory containing computer usable program code for setting a level of service for storage;
a bus system connecting the memory to a processor; and
a processor, wherein the processor executes the computer usable program code: to detect a storage event for a running application; to determine whether a requirement change occurred in response to detecting a performance level of the running application being beyond a threshold; to look up an unused negotiation stage from among at least one negotiation stage stored in a metadata structure in response to determining that a requirement change occurred, wherein the unused negotiation stage is looked up on the basis of at least one parameter comprising at least one of data throughput rate, time to recover from failure, and presence of backup; to request a service based on the unused negotiation stage; to receive a service provider response; to determine whether the service provider response is acceptable; and to commit a storage change for the running application based on the service provider response.

16. The data processing system of claim 15, wherein the processor executing the computer usable program code to detect a storage event further comprises executing the computer usable program code: to monitor a performance level; and to detect whether the performance level is beyond a threshold.

17. The data processing system of claim 15, wherein the processor executing the computer usable program code to detect a storage event further comprises executing the computer usable program code: to detect a scheduled event.

18. The data processing system of claim 15, wherein the processor executing the computer usable program code to request a service based on the unused negotiation stage further comprises executing the computer usable program code: to request a service based on the unused negotiation stage, wherein the unused negotiation stage has a token accounting.

19. The data processing system of claim 15, wherein following the processor executing the computer usable program code to determine whether the storage provider response is acceptable, the processor further executing the computer usable program code: to determine whether a second unused negotiation stage exists in response to a determining that the service provider response is not acceptable; to look up the second unused negotiation stage from among the at least one negotiation stage stored in the metadata structure in response to the determining that the second unused negotiation stage exists; to request a service based on the second unused negotiation stage; to receive a second service provider response; and to determine whether the second service provider response is acceptable.

20. The data processing system of claim 19, wherein the processor executing the computer usable program code to detect a storage event further comprises executing the computer usable program code: to monitor a performance level; and to detect whether the performance level is beyond a threshold.

* * * * *